US008214766B1

(12) United States Patent
Berger et al.

(10) Patent No.: US 8,214,766 B1
(45) Date of Patent: Jul. 3, 2012

(54) METHOD AND SYSTEM FOR PREVIEW CONTROL FOR IMAGE ADJUSTMENT

(75) Inventors: Ralf Berger, Acton, MA (US); Steve M. Troppoli, Carlisle, MA (US)

(73) Assignee: Adobe Systems Incorporated, San Jose, CA (US)

( * ) Notice: Subject to any disclaimer, the term of this patent is extended or adjusted under 35 U.S.C. 154(b) by 872 days.

(21) Appl. No.: 12/170,210

(22) Filed: Jul. 9, 2008

(51) Int. Cl.
*G06F 3/048* (2006.01)
(52) U.S. Cl. .......................... 715/838; 715/822
(58) Field of Classification Search .................. 715/838, 715/822
See application file for complete search history.

(56) References Cited

U.S. PATENT DOCUMENTS

| 5,898,436 | A | 4/1999 | Stewart et al. | |
|---|---|---|---|---|
| 6,680,749 | B1* | 1/2004 | Anderson et al. | 348/231.99 |
| 6,701,011 | B1 | 3/2004 | Nakajima | |
| 7,386,810 | B2* | 6/2008 | Masuda et al. | 715/838 |
| 2007/0222789 | A1 | 9/2007 | Yoshio et al. | |
| 2008/0307307 | A1* | 12/2008 | Ciudad et al. | 715/719 |
| 2009/0297022 | A1* | 12/2009 | Pettigrew et al. | 382/162 |
| 2009/0319897 | A1* | 12/2009 | Kotler et al. | 715/711 |
| 2010/0100214 | A1* | 4/2010 | MacDonald | 700/97 |
| 2011/0016406 | A1* | 1/2011 | Grosz et al. | 715/741 |
| 2011/0016426 | A1* | 1/2011 | Grosz et al. | 715/821 |
| 2011/0016431 | A1* | 1/2011 | Grosz et al. | 715/841 |

OTHER PUBLICATIONS

Jan Ozer, "Noromis Photo Lab 2.0", PCMag.com review, Jun. 6, 2007, 2 pages.

* cited by examiner

*Primary Examiner* — William Bashore
*Assistant Examiner* — David Phantana Angkool
(74) *Attorney, Agent, or Firm* — Robert C. Kowert; Meyertons, Hood, Kivlin, Kowert & Goetzel, P.C.

(57) ABSTRACT

An image-editing application may transform digital images. The image-editing application may display a thumbnail image control including a sequence of thumbnail images. A main image may also be displayed. One or more of the thumbnail images may be transformed according to different transformation adjustment levels. As a user input control rolls over each of the thumbnail images, the main image may be transformed according to the adjustment level associated with the thumbnail image that currently has the user input control over it, offering a preview of the transformation adjustment level associated with the currently active thumbnail image. A slider-bar control may be associated with the thumbnail image control. The slider-bar control may be associated with a complete range of adjustment levels. The image-editing application may coordinate the operation of the slider-bar control, the thumbnail control and the display of the main image.

51 Claims, 7 Drawing Sheets detect a dragging operation of a slider-box within a slier-bar control
410 transform the image to the adjustment level associated with the current position of the slider-box within the slier-bar control
420 display a numerical value for the current adjustment level; change the numerical value as the slider-box moves within the slider-bar control
430

FIG. 4

METHOD AND SYSTEM FOR PREVIEW CONTROL FOR IMAGE ADJUSTMENT

BACKGROUND

Image-editing is the process of altering, manipulating, enhancing and transforming digital images. Image-editing software may be broadly grouped into vector graphics editors, raster graphics editors and 3d modelers. Some image-editing programs may be used to render or create digital images. Digital cameras may be used to create digital images.

Raster images are stored in the form of a grid of picture elements, or pixels. Pixels are associated with color and brightness information. Image editors, such as Adobe Photoshop Express™, may change the pixel information in order to enhance the image. Pixels may be changed as a group or individually by transformation operations performed by the image editors.

Many image editors are configured to perform simple operations on images, such as rotating and cropping. Some image editors may be configured to perform more complex operations, such as correcting images for various lens distortions, sharpening or softening images and making color adjustments.

SUMMARY

Various embodiments of methods and systems for an image-editing application are disclosed. The image-editing application may receive digital image information and display the image on a display device. The image-editing application may display a thumbnail image control on the display device for a transformation operation. The thumbnail image control may include a sequence of thumbnail images of the displayed image.

The image-editing application may display the thumbnail images, such that each thumbnail image shows an adjustment level different than the other thumbnail images. This offers the user multiple previews of different transformation options.

In response to determining a user input control (e.g., mouse pointer) is over a particular thumbnail image, without selecting the particular thumbnail image, the image-editing application may temporarily transform the image according to the transformation operation and adjustment level associated with the particular thumbnail image. When the user input control moves off the thumbnail image, the image is restored to a previous state.

BRIEF DESCRIPTION OF THE DRAWINGS

FIG. 4 is a flow diagram illustrating a slider-bar control with the display of a numerical value associated with a transformation adjustment level, according to some embodiments.

Figure 1:
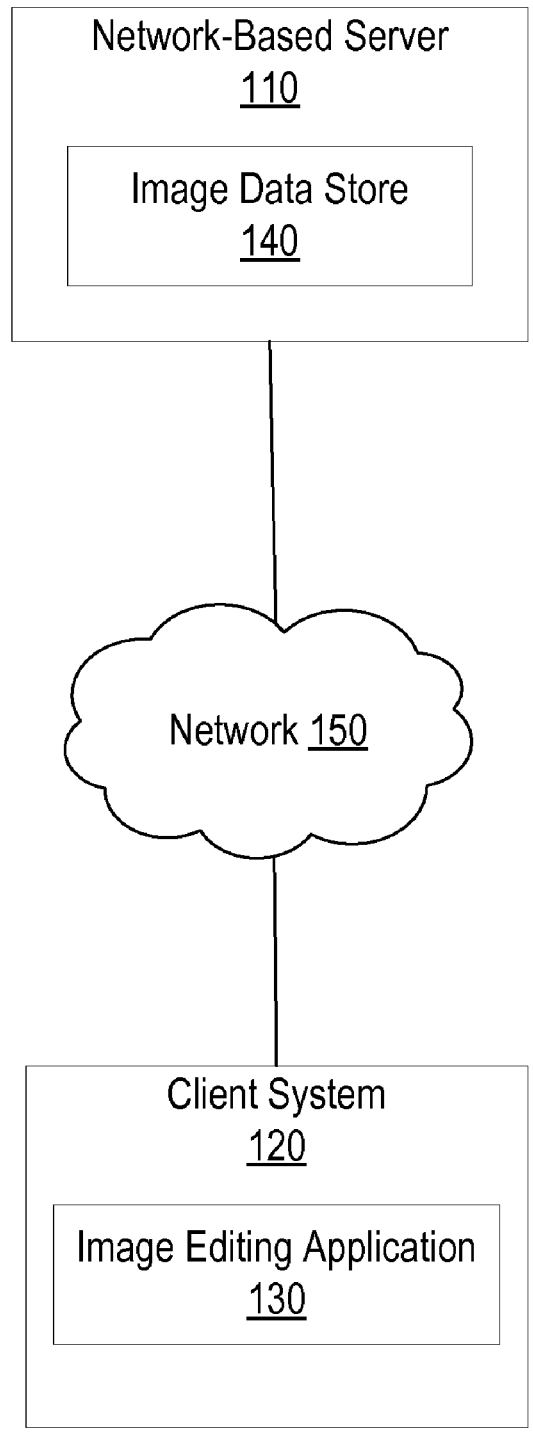
FIG. 1 is a block diagram illustrating an image-editing application, according to some embodiments.

While the system is described herein by way of example for several embodiments and illustrative drawings, those skilled in the art will recognize that the system is not limited to the embodiments or drawings described. It should be understood, that the drawings and detailed description thereto are not intended to limit the system to the particular form disclosed but on the contrary, the intention is to cover all modifications, equivalents and alternatives falling within the spirit and scope of the present system as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words, "include", "including", and "includes" mean including, but not limiting to.

DETAILED DESCRIPTION OF EMBODIMENTS

Image editing may be defined as the process of altering digital images or illustrations. Digital image editing applications, executed on a computing device, may be the primary tool used to manipulate, enhance, transform, create and render images, such as digital photographs and computer art. Due to the popularity of digital cameras, image editors are widely used to perform transformation operations on digital images, such as rotating, cropping and selectively changing colors. Many other operations are possible.

The methods and systems described herein are directed towards an image-editing application configured to perform image-editing operations on a digital image. The image-editing application may display a digital image (e.g., main image) on a display device. In addition, the image-editing application may display a group of two or more thumbnail images of the image on the display device. The group of thumbnail images may operate as a single control within the user interface. The thumbnail images may be displayed in a size smaller than the image. One or more of the thumbnail images may be transformed according to an image transformation operation. Each thumbnail image may be transformed according to a different adjustment level.

As a user input control (e.g., mouse pointer) moves over a thumbnail image, the image (e.g., main image) may be temporarily transformed to the adjustment level associated with the thumbnail image that currently has the user input control over it, resulting in a preview of the transformation operation and adjustment level associated with the thumbnail image. As the user input control moves over a group of thumbnail images, one to another, the image may be transformed according to the adjustment level associated with the thumbnail image that currently has the user input device over it. No selection of a thumbnail image is made until a selection event is received (e.g., mouse click). As the user input control moves off all thumbnail images, the image may be transformed to its previously selected state. (See the description of FIG. 2A and FIG. 5A for a more detailed discussion of moving a user input control over thumbnail images.)

The term, "user input control", as used herein, may refer to a mouse pointer, a keyboard cursor, a touch screen, or another method or system of accepting user input. The term "selection input", as used herein, may refer to a mouse click, a tap on a screen, receiving a particular keystroke from a keypad or keyboard, or another suitable method for accepting selection input.

A group of thumbnail images may be associated with various adjustment levels based on a specified transformation operation. In some cases, the adjustment levels may be predetermined, based on the specified transformation operation. In other cases the adjustment levels may be based on a specified range of adjustment levels.

In embodiments where the transformation operation is associated with a range of adjustment levels, the range may be based on a specified scale. For example, one transformation operation may be associated with a range of adjustment levels from −50 to 50. Another transformation operation may be associated with a range of adjustment levels from 0 to 100. Another transformation operation may be associated with percentage adjustment levels from 0% to 100%. Many other range scales may be utilized. (See the descriptions for FIGS. 3B and 3C for more information on ranges.)

In addition to the thumbnail images, the image-editing application may display a slider bar associated with a range of transformation levels. The image-editing application may coordinate the display of the image with the operation of the slider-bar and the thumbnail control. A user of the image-editing application may move a user input control over a particular thumbnail image within the thumbnail control. The slider-thumb may be positioned within the slider-bar control relative to the position of the user input control over the thumbnail control. In response to detecting the user input control moving over a particular thumbnail image within the thumbnail control, the image-editing application may transform the image according to the current transformation adjustment level associated with the particular thumbnail image and the position of the slider-thumb within the slider-bar control. (See the description for FIGS. 2B and 5B for more information on the operation of the slider-bar control.)

The term "Currently Active Thumbnail", as used herein, may refer to the thumbnail image within the group of thumbnail images that currently has a user input control (e.g., mouse pointer) over it. For example, an image-editing application may detect a particular thumbnail image has the user input control is hovering over it by detecting a mouse-over event. The image-editing application may detect the user input control has moved off the particular thumbnail image by detecting a mouse-off event.

The term "Selected Thumbnail", as used herein, may refer to a particular thumbnail image within the group of thumbnail images associated with a selection event. For example, a user associated with a client system may select (e.g., mouse-click) a particular thumbnail image. In this case, the transformation adjustment level associated with the selected thumbnail image may become the currently selected transformation adjustment level. When the user input control moves off all thumbnail images, the image (e.g., main image) may be transformed according to the currently selected adjustment level. (See the description for FIG. 3A for more information.)

The term "Default Thumbnail", as used herein, may refer to the thumbnail image within the group of thumbnail images that is displayed without a transformation. In other words, the default thumbnail may be displayed as the image was initially displayed prior to a transformation operation. When an image is initially displayed, the default thumbnail image may be the same thumbnail image as the selected thumbnail image.

A special identifier or indication may be displayed for each of: a default thumbnail image, a selected thumbnail image and a currently active thumbnail image. The identifier or indication may be implemented as one of: a graphical image transposed over the thumbnail image, a border displayed in a manner different than the other thumbnail images (e.g., lighter, darker or heavier), displaying the thumbnail image in a highlighted state or displaying the thumbnail image in a darkened state. Another suitable indication may be used.

FIG. 1 is a block diagram illustrating an image-editing system, according to some embodiments. A client system 120 may include an image-editing application 130. Client system 120 may be implemented as any computing device configured to execute program instructions and display images on a display device. Client system 120 may be implemented as a laptop computer, desktop computer, server, tablet computing device, video game console, personal digital assistant (PDA), digital camera or cell phone. Other computing devices have been contemplated.

Client system 120 may be configured to host an operating system. The operating system may be configured to manage client system 120 resources, data and user input. The operating system may provide services to image-editing application 130, such as managing files (e.g., digital images) and communicating via network 150. Example operating system implementations include Linux, Mac OS X™, Microsoft™ Windows™, and Solaris™. Other operating systems have been contemplated.

In some embodiments, image-editing application 130 may be configured to edit digital images. Example implementations of image-editing application 130 include Adobe Photoshop™ and Adobe Photoshop Express™. Image-editing application 130 may execute various transformation operations on the image data in order to change the appearance of the image.

Image-editing application 130 may be integrated with, or be part of a network-enabled application (e.g., web browser). For example, a network-enabled application may be integrated with Adobe Flash™. In other cases image-editing application 130 may be implemented as an Active-X™ component, a plugin or another suitable component. Image-editing application 130 may be written in a scripting language and compiled into byte code. Image-editing application 130 may be downloaded from a web site (e.g., embedded in a web page) and invoked by client system 120 when received. Certain components of image-editing application 130 may be located on client-system 120 and other components may be located on network-based server 110, such that components on each system may work together to perform image-editing functions.

In some embodiments, image-editing application 130 may be written in a procedural language, such as C or C++ and compiled into an executable program. Image editing application 130 may be written in an object oriented language, such as Java™ or C#™ and execute in conjunction with a virtual machine (Java Virtual Machine (JVM)) or a framework, such as .NET or J2EE.

In some cases, image editing may occur entirely on client system 120. Image-editing application 130 may edit, read and write image data locally on client system 120, such as to and from a storage device. Storage device implementations may include one or more disk drives or non-volatile memory storage, such as FLASH memory.

In some embodiments, image-editing application 130 may transfer images to and from image data store 140, located on network-based server 110. Image-editing application 130 may retrieve images from a camera device connected directly to client system 120. In other cases image-editing application 130 may be integrated with a camera device and images may be loaded directly into image editing application 130.

Client system 120 may be implemented as a thin client and image editing may take place on network-based server 110. In this case, image-editing application 130 may display image information, but the transformation operations may be performed on network-based server 110, separate from client system 120.

Image-editing application 130 may be configured to read compressed images. Many image file formats use data compression to reduce file size and save space. Digital compression of images may take place in a camera or on a computing device in an image editor. One standard file format for storing digital image information is the JPEG format. The JPEG standard specifies the codec, which defines how an image is compressed into a stream of bytes and decompressed back into an image. The JPEG standard also defines the file format used to contain the stream.

Image files that utilize the JPEG compression standard are commonly called, "JPEG files". The most common filename extensions for files employing JPEG compression are .jpg and .jpeg. JPEG is described herein as an example. The methods and systems described herein are not file format specific. Many other file formats are possible.

In various embodiments, network 150 may be configured to allow data to be exchanged between image-editing application 130 on client system 120 and network-based server 110. Network 150 may correspond to various methods of communication between entities and may include, but is not limited to communication via telephone, fax, email, messages (e.g., instant messaging), voice messages, and electronic documents (e.g., web page, email or file transfers). In general, network 150 may represent any method that one entity may utilize to communicate with another entity. While network 150 may be illustrated in a generalized manner, one of ordinary skill in the art will recognize that network 150 is meant to be representative of a complete communication path between the entities depicted in FIG. 1 with a specific type of communication channel. For example, network 150 may represent one or more communications channels and may include one or more telecommunications networks as well as various data networks. Network 150 may include network devices such as circuits, switches, routers, hubs and/or gateways. Network 150 may support communication via wired or wireless general data networks, such as any suitable type of network including the Internet and/or Ethernet LAN; via telecommunications/telephony networks such as analog voice networks or digital fiber communications networks; via storage area networks such as Fiber Channel SANs, or via any other suitable type of network and/or protocol. Data may be transmitted on network 150 using Hyper Text Transport Protocol (HTTP), Secure Hyper Text Transport Protocol (HTTPS), Secure Socket Layer Protocol (SSL), Transport Layer Security Protocol (TLS) or another suitable network transport protocol. In various embodiments, the application components described herein may utilize any suitable compression protocol or cryptographic protocol when communicating over network 150.

Network-based server 110 may be implemented as any computing system configured to connect to network 150 and communicate with client system 120. In some embodiments, network-based server 110 may be implemented as a web server. Network-based server 110 may service requests from one or more client systems 120. Network-based server 110 may be configured to listen on a port (e.g., port 80) waiting for client system 110 to send a request message, such as for an image file stored in image data store 140. When network-based server 110 receives a request, it may be configured to fetch content (e.g., web content or image file) and forward the content to client system 120. Network-based server 110 may be implemented as one or more physical systems connected to one or more storage devices. Network-based server 110 may be configured to run special web server software to service client system 120 requests. Examples include Microsoft™ Internet Information Systems™ and Apache™. Other server host application software is possible. In some embodiments, network-based server 110 may provide web services or be implemented as an application server.

Figure 2A:
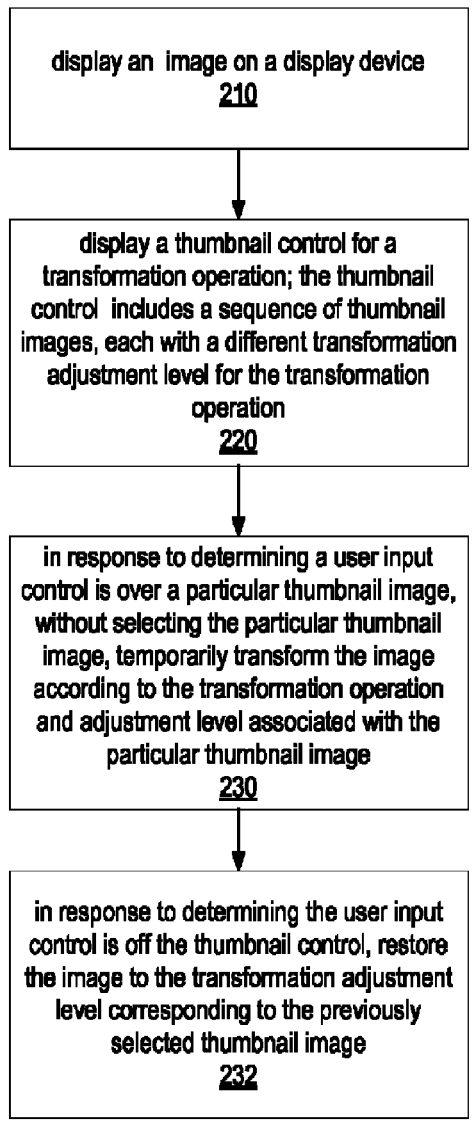
FIG. 2A is a flow diagram illustrating a thumbnail control within an image-editing application, according to some embodiments.

FIG. 2A is a flow diagram illustrating a thumbnail control within an image-editing application, according to some embodiments. As shown in block 210, image-editing application 130 may display an image on a display device. Image-editing application 130 may receive, or retrieve the image from various locations. Examples include local storage (e.g., connected to client system 120) or image data store 140 located on network-based server 110. In some cases, an image may be retrieved directly from a camera device.

As shown in block 220, image-editing application 130 may display a thumbnail control for a transformation operation on the display device. The thumbnail control may include a sequence of thumbnail images (e.g., two or more thumbnail images) of the image, such that each of the thumbnail images may be displayed with a transformation adjustment level different than the other thumbnail images for the transformation operation.

As shown in block 230, in response to determining a user input control is over a particular thumbnail image, without selecting the particular thumbnail image, image-editing application 130 may temporarily transform the image according to the transformation operation and adjustment level associated with the particular thumbnail image. For example, image-editing application 130 may display two or more thumbnail images of the image. The two or more thumbnail images may be displayed with different levels of adjustment. As the user input control moves over each thumbnail image, the image (e.g., the main image) may be transformed according to the transformation adjustment level that is associated with the current thumbnail, giving the user a preview of the transformation adjustment level associated with the currently active thumbnail image. In one example, the user input control may move over all images (e.g., one after another) and the image (e.g., main image) may change (e.g., preview) as the user input control moves. Note that the user does not have to select (e.g., mouse click) a thumbnail for the image to transform. When the user input control moves off the thumbnail control (i.e., all thumbnail images) the image may be transformed according to the currently selected thumbnail image as shown in block 232.

Figure 2B:
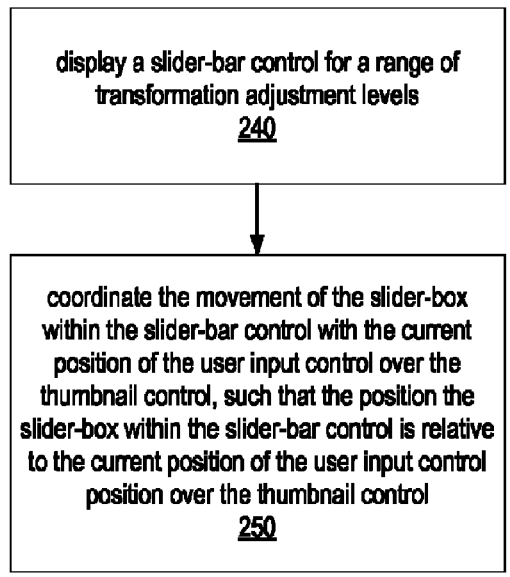
FIG. 2B is a flow diagram illustrating a slider-bar control within an image-editing application, according to some embodiments.

FIG. 2B is a flow diagram illustrating a slider-bar control within an image-editing application, according to some embodiments. As shown in block 240, image-editing application 130 may display a slider-bar control and associate the slider-bar control to a range of transformation adjustment levels. Image-editing application 130 may coordinate the movement of the slider-thumb within the slider-bar control with the current position of the user input control over the thumbnail control. If the user input control is placed over a particular thumbnail image, image-editing application 130 may position the slider-thumb within the slider-bar relative to the current position of the particular thumbnail control, as shown in block 250. Image-editing application 130 may transform the image according to the current adjustment level associated with the current position of the slider-thumb within the slider-bar control.

Figure 2C:
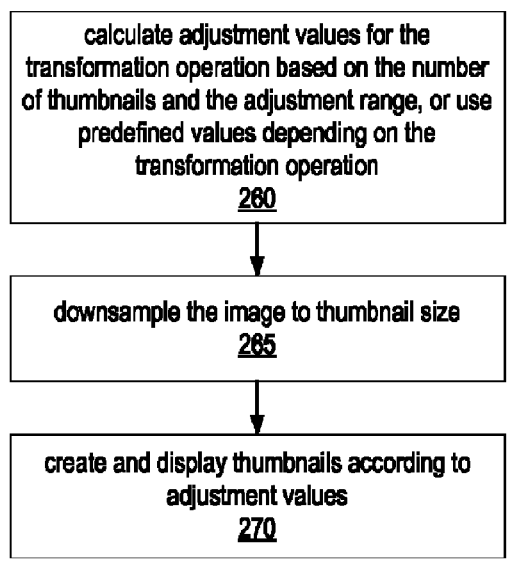
FIG. 2C is a flow diagram illustrating the creation of thumbnail images within an image-editing application, according to some embodiments.

FIG. 2C is a flow diagram illustrating the creation of thumbnail images within an image-editing application, according to some embodiments. As shown in block 260, image-editing application 130 may calculate adjustment values for the transformation operation based on the number of displayed thumbnail images. In the case where the transformation operation is associated with a range of adjustment levels, image-editing application 130 may determine adjustment levels within the range to assign to the thumbnail images. In other cases, a particular transformation operation may not be associated with a range of adjustment values; in this case the thumbnail images may be assigned pre-determined adjustment values.

As shown in block 265, image-editing application 130 may downsample the image to a thumbnail size. The thumbnails may be created according to their associated adjustment values as shown in block 270.

Figure 3A:
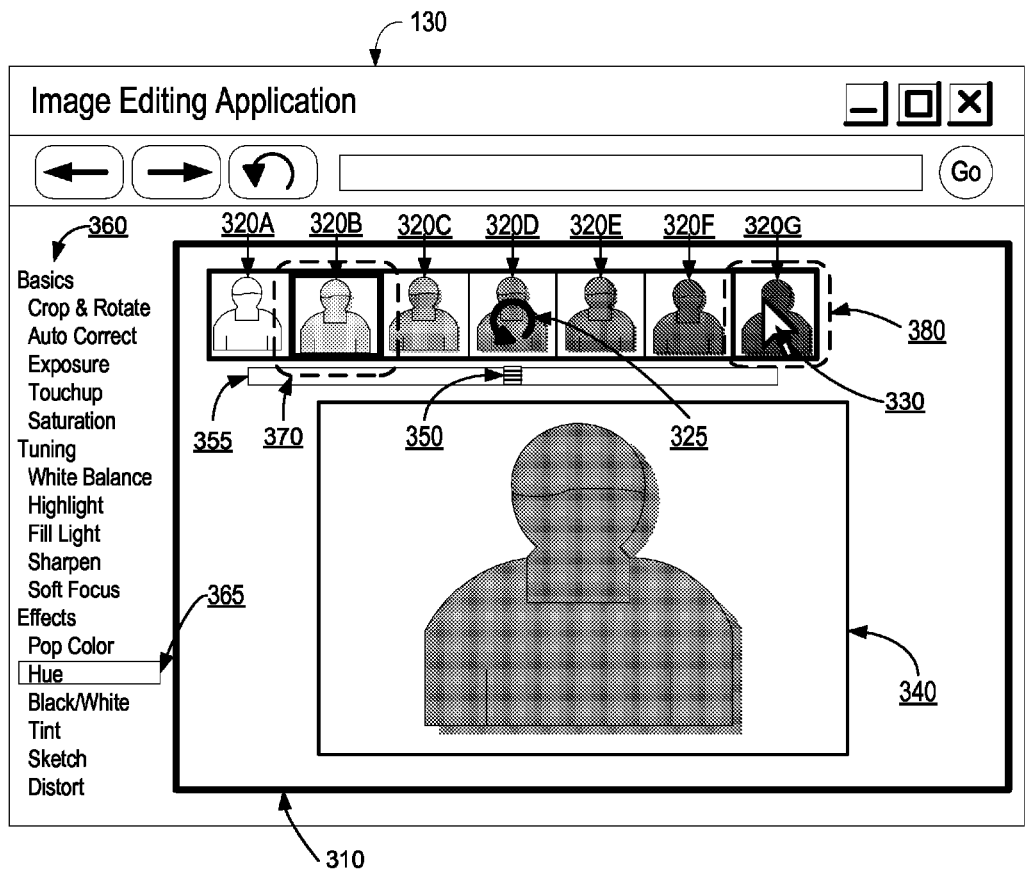
FIG. 3A is a block diagram illustrating an image-editing application, according to some embodiments.

FIG. 3A is a user interface block diagram illustrating an image-editing application, according to some embodiments. The figures provided herein are examples. The arrangements of the displayed items in the figures are provided for description purposes only and are not meant to limit the items displayed or the manner in which they are displayed. Items in the figures may be rearranged or omitted altogether. Other items may be added and displayed in various implementations.

As described above, in some cases image-editing application 130 may be configured to execute within a web browser. Item 130 within FIG. 3 is one example of such an implementation.

Item 360 may include one or more menu or option items corresponding to various transformation operations. Transformation operations may be broken into three main categories: Basics, Tuning and Effects.

Example Basic transformation operations include:
Auto-Correcting—Adjusts the color and contrast of an image.
Exposure—Change the brightness of the image.
Saturation—Adjust the amount of gray in proportion to the hue.
Example Tuning transformation operations include:
White Balance—Change the type of lighting in a photo (e.g., outside lighting vs. inside fluorescent tube lighting).
Highlight—The brightest parts of a photo are the highlights. Brighten or darken just the brightest part of the photo, without affecting the darker parts.
Fill Light—Fill Light brightens the dark area without over-brightening the background.
Sharpen—Everything comes more into focus
Soft Focus—Creates a subtle blur for artistic effect.
Example Effects transformation operations include:
Pop Color—Change certain colors in the image.
Hue—Changes all the colors in a photo at once.
Black and White—Control how the colors are converted when changing the image to black and white.
Tint—Change certain colors within the photo.
Sketch—Makes any image (e.g., digital photo) look like it was drawn by a user.

Many other transformations are possible. Each menu selection shown at item 360 may be associated with one or more transformation operations that may be executed on the image. In some cases a transformation operation may correspond to a range of adjustment levels (e.g., from a minimum level to a maximum level). In other cases, a transformation operation may be associated with adjustment levels that are not associated with a particular range. Item 365 shows the currently selected transformation operation of "Hue".

Image-editing application 130 may display various controls and image objects used to help the user understand the effects of various transformations. Image-editing application 130 may display an image (e.g., main image) as shown at item 340. Image 340 may be displayed in a size larger than the thumbnail images 320A-G.

As shown at items 320A-G, image-editing application 130 may display a group of two or more thumbnail images. In this example, seven thumbnail images 320 of the image 340 are displayed. Each thumbnail image 320A-G may be displayed with a different transformation adjustment level. One thumbnail image may be displayed with a neutral transformation adjustment level, or no transformation adjustment level. The thumbnail image with a neutral transformation adjustment level may be referred to as the default thumbnail image. In some embodiments, an indication (e.g., item 325) may be displayed over the default thumbnail image.

Item 330 represents a user input control. In the example, shown in FIG. 3A, a mouse pointer is depicted. In some embodiments, a highlighted or darkened border may designate the currently active thumbnail image, as shown in item 380. As user input control 330 moves across the thumbnail images 320, the indication may change to the currently active thumbnail image. In various embodiments, other visual designations may depict the currently active thumbnail image, such as changing the thumbnail image's brightness level of displaying another suitable graphical indication.

A user associated with client system 120 may perform a selection operation by selecting a thumbnail image (e.g., pointing to a thumbnail image with a mouse pointer and pressing a mouse key). In the example shown at item 370, a highlighted border or darkened border may designate the currently selected thumbnail image. The border for the selected thumbnail image 370 may be darker or different in some way than the border for the currently active thumbnail image 380, so that the user may distinguish the currently selected thumbnail image from the currently active thumbnail image. If the user input control moves off all thumbnail images, image 340 may be transformed according to the adjustment level associated with the selected thumbnail image. In this case, border 370 designates that image 320B is the currently selected thumbnail image.

A user may compare two transformation adjustment levels by selecting one thumbnail image (e.g., clicking on the image) and moving the user input control (e.g., mouse pointer 330) over another thumbnail image, causing image 340 to be transformed to the transformation adjustment level associated with the thumbnail that currently has the user input control over it. The currently active thumbnail image may take precedence over the currently selected thumbnail image, meaning if the user input control is over a thumbnail image (making it the currently active thumbnail image) the image (e.g., main image) may be transformed according to the adjustment level associated with the currently active thumbnail image instead of the currently selected thumbnail image. This allows a user to preview and/or compare transformations without saving the image.

Image-editing application 130 may detect the position of the user input control. Image-editing application 130 may detect thumbnail selection information, such as a selection event (e.g., mouse-click) over a particular thumbnail image or receive notification of a touch screen receiving a touch over a particular thumbnail image, or receive notification that a cursor control or another type of pointing device has selected a particular image. Image-editing application 130 may receive keyboard entry information selecting a particular thumbnail image. Other controls (not shown in FIG. 3) may be utilized for saving images, canceling changes, uploading images and downloading images.

Figure 3B:
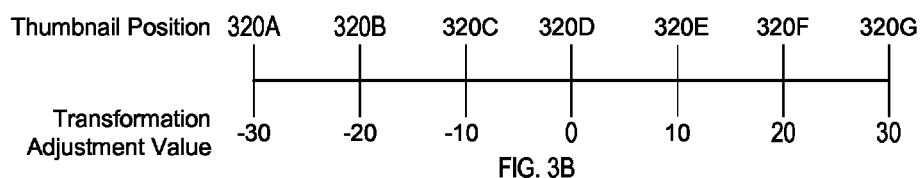
FIG. 3B is a line diagram illustrating adjustment levels associated with thumbnail image positions, according to some embodiments.

FIG. 3B is a line diagram illustrating adjustment levels associated with thumbnail image positions, according to some embodiments. As described above, image-editing application 130 may determine a range of transformation adjustment levels for a particular transformation operation and select certain levels within the spectrum of choices to be associated with thumbnail images 320A-320G. A user associated with image-editing application 130 may select the most appealing thumbnail image without having to know or enter specific adjustment levels.

In the example shown in FIG. 3A, the selected transformation operation is the Hue transformation (e.g., item 365). The range of transformation levels, as shown in FIG. 3B is −30 to 30. Thumbnail 320A is assigned an adjustment level of −30, thumbnail 320B is assigned an adjustment level of −20, and so on. Note that thumbnail 320D has an adjustment level of 0. In this case an adjustment level of 0 indicates that no transformation has been applied. Note that the range −30 to 30 shown in FIG. 3B is only an example. Many other ranges are possible.

Figure 3C:
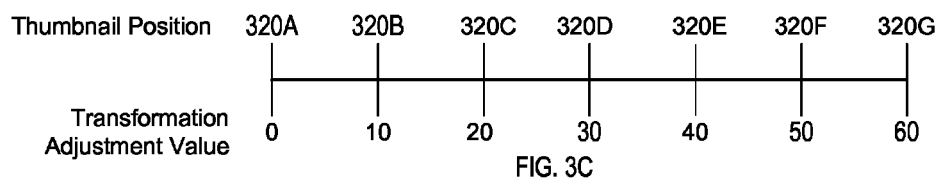
FIG. 3C is a line diagram illustrating adjustment levels associated with thumbnail image positions, according to some embodiments.

Image-editing application 130 may determine a range for a specified transformation operation from zero to some positive integer value, as shown in FIG. 3C. In this case, the thumbnail that has no transformation may be located on the far left of the group of thumbnails. The adjustment level may increment from a minimum level to a maximum level as the thumbnails are displayed from left to right. In other embodiments, the range may start at the far right and progress from right to left. In some cases the adjustment level may be a numerical value or level and in other cases it may be a percentage (e.g., from 0% to 100%).

Image-editing application 130 may receive a menu selection notification associated with a particular transformation. Image-editing application 130 may determine the range of adjustment levels for the selected transformation operation and associate the range of adjustment levels to slider-bar control 355.

In some embodiments, image-editing application 130 may determine N−1 adjustment levels within the range of adjustment levels, where N equals the number of thumbnail images. In most cases, the number of thumbnail images will be less than the total number of possible adjustment levels. For example, there may be seven images (e.g., N=7) and 100 possible adjustment levels for the specified transformation. In this case, image-editing application 130 may select N−1 adjustment levels, whereby the selections may be evenly distributed among the total range of adjustment levels. One thumbnail image may not be adjusted and may be displayed as the default.

Image-editing application 130 may transform the thumbnail images according to the selected transformation operation (e.g., the selected menu item), and each of the thumbnail images may be adjusted to one of the selected adjustment levels.

FIG. 4 is a flow diagram illustrating a slider-bar control with the display of a numerical value associated with a transformation adjustment level, according to some embodiments. As shown in block 410, image-editing application 130 may detect a dragging operation of slider-thumb 350 within slider-bar control 355. Image-editing application 130 may transform the image to the adjustment level associated with the current position of the slider-thumb 350 within the slider-bar control 355, as shown in block 420. In addition, image-editing application 130 may display a numerical value for the current adjustment level (e.g., see item 390 in FIG. 5B). Image-editing application 130 may change the numerical value as slider-thumb 350 moves (e.g., is dragged) within the slider-bar control 355).

Figure 5A:
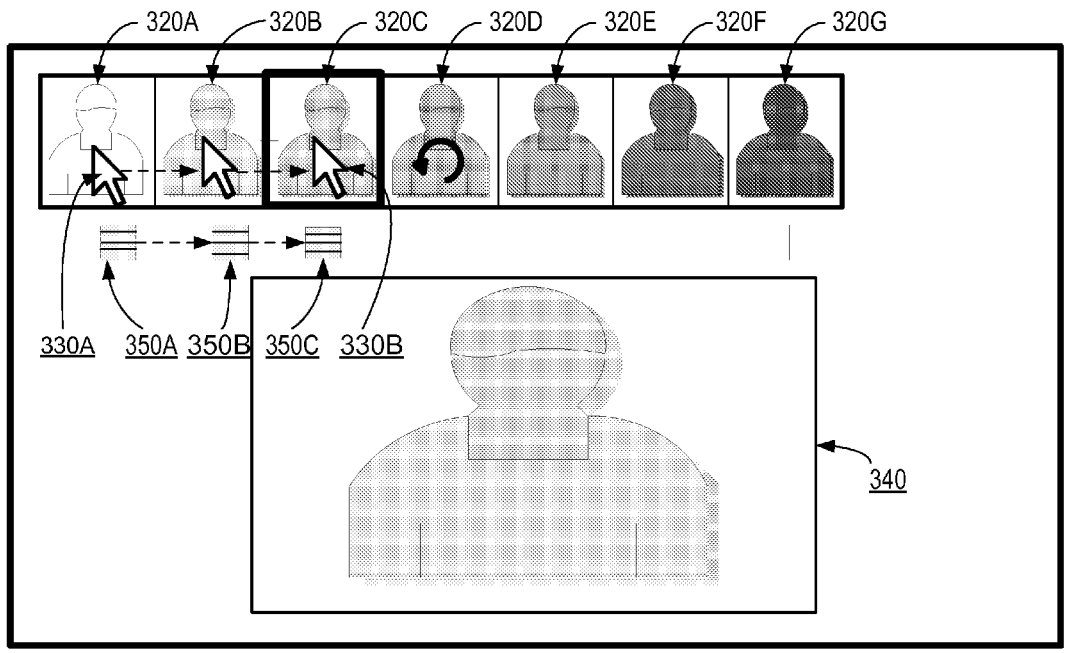
FIG. 5A is a block diagram illustrating an image-editing application with a user input control 330 moving over multiple thumbnail images 320A-G, according to some embodiments.

FIG. 5A is a block diagram illustrating an image-editing application with a user input control 330 moving over multiple thumbnail images 320A-G, according to some embodiments. As the user input control 330 moves from thumbnail 320A to 320B and then to 320C, the slider-thumb 350 moves in a coordinated fashion from position 350A to position 350B and then to 350C. In addition, when user input control 330 is over thumbnail image 320A (making 320A the currently active thumbnail image) image 340 is transformed according to the adjustment level associated with image 320A. When user input control 330 moves off of thumbnail image 320A and onto thumbnail image 320B (making 320B the currently active thumbnail image) image 340 is transformed according to the adjustment level associated with thumbnail image 320B. As user input control 330 moves off of thumbnail image 320B and onto thumbnail image 320C (making 320C the currently active thumbnail image) image 340 is transformed according to the adjustment level associated with thumbnail image 320C.

When user input control is over thumbnail image 320C, image-editing application 130 may receive a selection event (e.g., mouse click) making image 320C the currently selected thumbnail image. (Note the darkened border around thumbnail image 320C.) If user input control 330 moves off all thumbnail images, image 340 may be transformed according to the adjustment level associated with the currently selected thumbnail image (e.g., image 320C). If user input control 330 moves over another thumbnail image, making it the currently active thumbnail, image 340 may be transformed according to the currently active thumbnail image. Image 340 may be transformed according to the currently active thumbnail image, meaning the currently active thumbnail image may take precedence over the currently selected thumbnail image. This allows the user to compare previews of various adjustment levels by simply moving the user input control from one thumbnail image to another.

Figure 5B:
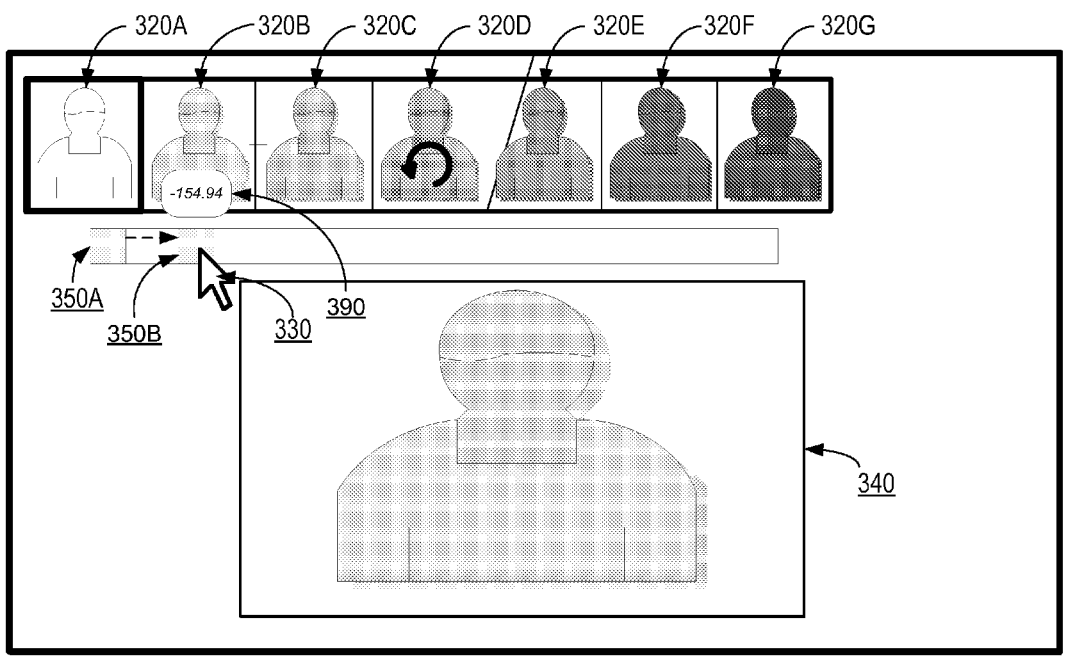
FIG. 5B is a block diagram illustrating the slider-bar operation associated with incremental transformation adjustments, according to some embodiments.

FIG. 5B is a block diagram illustrating user input control 330 movement associated with incremental adjustments, according to some embodiments. Slider-bar control 355 provides access to the full range of transformation adjustment levels. In other words, it provides full fidelity. For example, in some cases, it may be desirable to make transformation adjustments in increments smaller than what is allowed selecting a thumbnail image 320.

As shown in the example illustration in FIG. 5B, the user may manipulate user input control 330 to slide the slider-thumb 350 from the position shown at 350A to the position shown at 350B. As the slider-thumb 350 moves, an indication of the current adjustment level may be displayed in a window or text box at item 390. In this case, the slider-thumb 350 may be configured to move to any transformation adjustment level within the range of possible adjustment levels. As slider-thumb 350 is moved, item 390 may be updated to display the current adjustment level and image-editing application 130 may transform image 340 to the selected adjustment level. Note that as slider-thumb 350 moves incrementally, image 340 is transformed incrementally. The user does not have to perform another operation (e.g., release the mouse button) for image 340 to be transformed. When the user releases slider-thumb 350, the image is set to the particular adjustment level associated with the new position of slider-thumb 350. If slider-bar 355 receives a selection event (e.g., mouse click) at a particular location, slider-thumb 350 may jump to that location and image 340 may be transformed to the adjustment level associated with the new location of slider-thumb 350.

Figure 6:
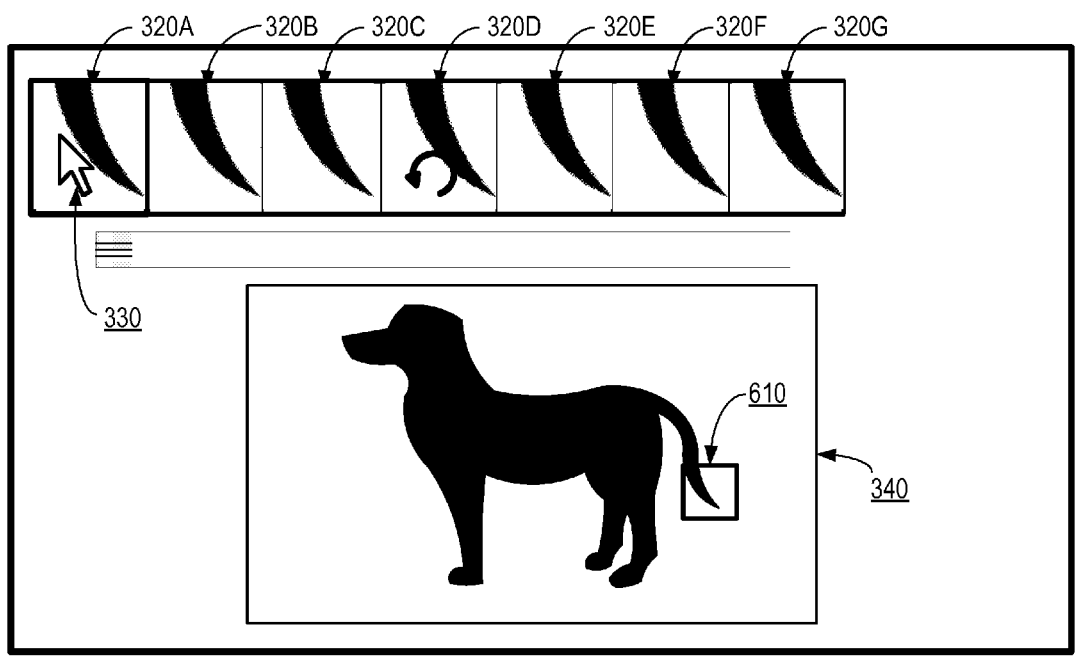
FIG. 6 is a block diagram illustrating the operation of a thumbnail control used in zoom-in operations, according to some embodiments.

FIG. 6 is a user interface illustration of the operation of a thumbnail control used for zoom-in operations, according to some embodiments. For some transformation operations, it may be desirable to zoom-in on a particularly detailed location within the image 340 in order to give the user associated with client system 120 a zoom-in view of how the transformation may effect image 340. This is useful for detail adjustments, such as sharpen and soften transformation operations.

Image-editing application 130 may determine an optimal location within image 340 that provides detailed visibility for the desired operation. A box, circle or another graphical indication may be drawn around or displayed at the selected area as shown at item 610. Each thumbnail image 320 may provide a zoom-in view of the selected area and each thumbnail image 320 may be adjusted to a different transformation adjustment level. User input control 330 may move across the thumbnail images 320A-320G and the transformations may operate in the same manner as described above for FIGS. 5A and 5B.

In response to detecting a dragging operation within the image, image-editing application 130 may move the subsection to a new location corresponding with the current position of the user input control. Image-editing application 130 may display the area of the new location in each of the thumbnail images according to a zoom-in view of the subsection.

Figure 7:
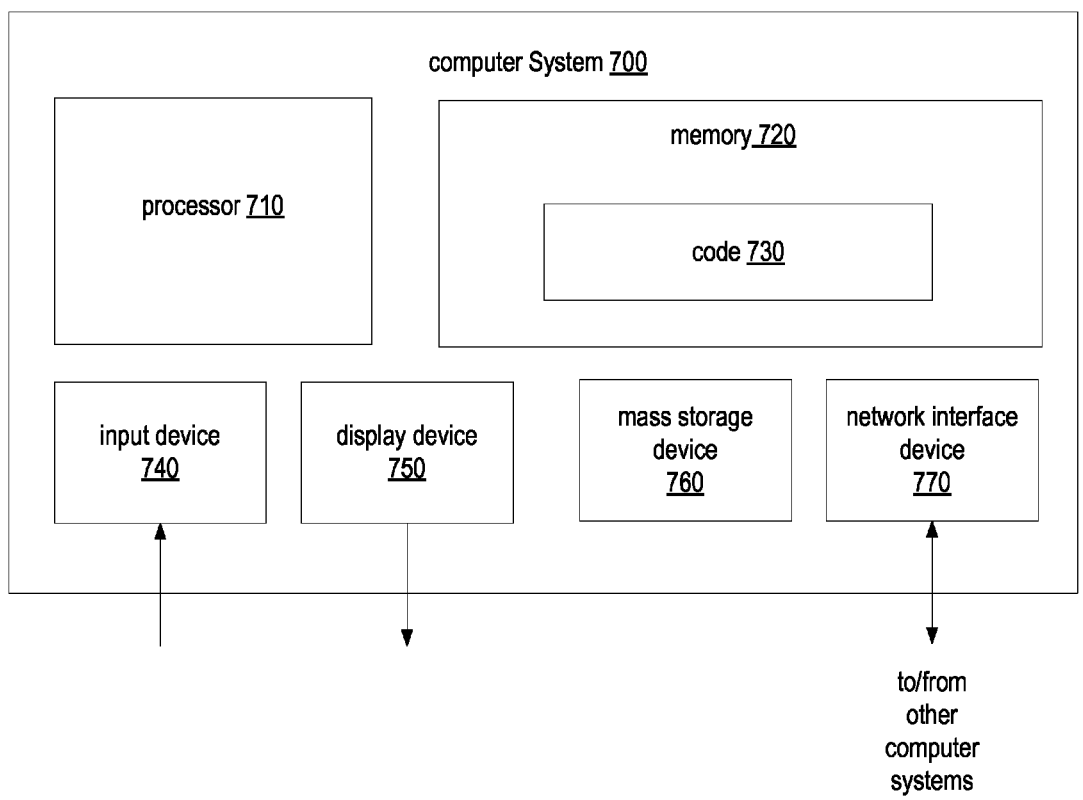
FIG. 7 is a block diagram illustrating a system for implementing an image-editing application, according to some embodiments.

FIG. 7 is a block diagram illustrating a computing device, according to an embodiment. Various components of embodiments of client system 120 and network-based server 110 and nodes, etc., as described herein, may be executed on one or more computer systems, which may interact with various other devices. One such computer system is illustrated by FIG. 7. In the illustrated embodiment, computer system 700 includes one or more processors 710 coupled to a system memory 720. Computer system 700 further includes a network interface 770 and one or more input/output devices 740/750, such as a user input control device, keyboard, audio device and display device 750. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, Scalable Processor Architecture (SPARC), or Million Instructions per Second (MIPS) Instruction Set Architectures (ISAs), or any other suitable ISA. In multiprocessor systems, each of processors 710 may commonly, but not necessarily, implement the same ISA.

System memory 720 may be configured to store program instructions 730 and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. Program instructions and/or data may also be stored, for example, on a hard disk. In the illustrated embodiment, program instructions and data implementing desired functions, such as those described above for image-editing application 130, are shown stored within system memory 720 as program instructions 730 and data storage 760, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or Digital Versatile Disc (DVD) Read Only Memory (ROM)/Compact Disk-Read Only Memory (CD-ROM) coupled to computer system 700. Program instructions and data stored via a computer-accessible medium may be transmitted by transmission media or signals such as electrical, electromagnetic, or digital signals, which may be provided via a communication medium such as a network and/or a wireless link, such as may be implemented via network interface 770.

Network interface 770 may be configured to allow data to be exchanged between computer system 700 and other devices attached to a network, such as other computer systems, or between nodes of computer system 700. In various embodiments, network interface 770 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network and/or protocol.

Input/output devices 740 and 750 respectively, may in some embodiments include one or more display terminals, keyboards, keypads, touchpads, scanning devices, voice or optical recognition devices, or any other devices suitable for entering or retrieving data by one or more computer system 700. Multiple input/output devices 740 and 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 770.

Memory 720 may include program instructions 730, configured to implement at least a portion of embodiments of the image-editing application 130 as described herein, and data storage 760, comprising various documents, tables, databases, etc. accessible by program instructions 730. In one embodiment, program instructions 730 may include software elements of the image-editing application 130 illustrated in the Figures, and data storage 760 may include data used in embodiments of image-editing application 130. In other embodiments, different software elements and data may be included. Program instructions and/or data may be stored, for example, on various types of memory including hard disks.

Those skilled in the art will appreciate that computer system 700 is merely illustrative and is not intended to limit the scope of the image-editing application 130 as described herein. In particular, the computer system and devices may include any combination of hardware or software that can perform the indicated functions, including computers, network devices, internet appliances, PDAs, mobile phones, pagers, etc. Computer system 700 may also be connected to other devices that are not illustrated, or instead may operate as a stand-alone system. In addition, the functionality provided by the illustrated image-editing application 130 may in some embodiments be combined in fewer image-editing components or distributed in additional image-editing components. Similarly, in some embodiments, the functionality of some of the illustrated image-editing components 130 may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software image-editing components 130 may execute in memory on another device and communicate with the illustrated computer system via inter-computer communication. Some or all of the image-editing application 130 or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, provided via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. Synchronous Dynamic RAM (SDRAM), Double Data Rate RAM (DDR RAM), RAMBUS Dynamic RAM (RDRAM), Static RAM (SRAM), etc.), Read Only Memory (ROM), etc. as well as transmission media or signals such as electrical, electromagnetic, or digital signals, provided via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
    displaying a main image within an area of a user interface on a display device;
    displaying a thumbnail control within a different area of the user interface on the display device for an image transformation operation,
        wherein said thumbnail control comprises a sequence of thumbnail images calculated from the main image;
        wherein each of the one or more thumbnail images shows a different adjustment level for the same image transformation operation to be applied to said main image so that the thumbnail images of the thumbnail control display a series of image transformation adjustment levels for the same image;
    in response to determining a user input control is over a particular thumbnail image, without selecting the particular thumbnail image, temporarily transforming the main image according to the transformation operation and adjustment level associated with the particular thumbnail image,
        wherein said temporarily transforming the main image occurs within the area of the user interface for the main image, and
        wherein said temporarily transforming the main image is temporary such that the adjustment level associated with the particular thumbnail image is no longer applied to the main image when the user input control is moved off the particular thumbnail image.

2. The computer-implemented method of claim 1, wherein said determining a user input control is over a particular thumbnail image comprises receiving a mouse over event for the particular thumbnail control.

3. The computer-implemented method of claim 1, further comprising:
    detecting user input selecting a thumbnail image;
    changing the main image to correspond to the selected thumbnail image.

4. The computer-implemented method of claim 3, further comprising:
    in response to determining the user input control is off the thumbnail control, restoring the main image to correspond to the selected thumbnail image.

5. The computer-implemented method of claim 3, wherein said user input selecting a thumbnail image comprises a mouse click.

6. The computer-implemented method of claim 3, further comprising:
    in response to detecting the user input control is over another thumbnail image other than the selected thumbnail image, without selecting the another thumbnail image, temporarily transforming the main image according to the transformation operation and adjustment level associated with the another thumbnail image.

7. The computer-implemented method of claim 6, further comprising:
    detecting the user input control is off the thumbnail control; and
    transforming the main image according to the transformation operation and adjustment level associated with the selected thumbnail image.

8. The computer-implemented method of claim 1, further comprising:

displaying a slider-bar control for a range of transformation adjustment levels;

coordinating the movement of a slider-thumb within the slider-bar control with the current position of the user input control over the thumbnail control, wherein said coordinating comprises positioning the slider-thumb within the slider-bar control relative to the current user input control position over the thumbnail control.

9. The computer-implemented method of claim 8, further comprising:

detecting a dragging operation of the slider-thumb within the slider-bar control; and transforming the main image to the adjustment level associated with the current position of the slider-thumb within the slider-bar control, wherein said transforming is performed as the slider-thumb is dragged within the slider-bar.

10. The computer-implemented method of claim 9, further comprising, displaying a numerical value for the adjustment level, wherein the numerical value changes as the slider-thumb moves within the slider-bar control.

11. The computer-implemented method of claim 1, further comprising:

displaying an indication of a default transformation adjustment level on a default thumbnail image, wherein said default thumbnail image corresponds to a neutral adjustment level.

12. The computer-implemented method of claim 1, further comprising:

determining a subsection of the main image, wherein said subsection of the main image is an area smaller than the entire image; and displaying the area of the subsection of the main image within each of the thumbnail images according to a zoom-in view of the subsection.

13. The computer-implemented method of claim 12, further comprising:

in response to detecting a dragging operation within the main image:

moving the subsection to a new location corresponding with the current position of the user input control; and displaying the area of the new location in each of the thumbnail images according to a zoom-in view of the subsection.

14. The computer-implemented method of claim 1, wherein the transformation operation is one of an auto-correct transformation operation, an exposure transformation operation, or a saturation transformation operation.

15. The computer-implemented method of claim 1, wherein the transformation operation is an effect operation, wherein the effect operation is one of a pop-color effect operation, a hue effect operation, a black-and-white effect operation, a tint effect operation, or a sketch effect operation.

16. The computer-implemented method of claim 1, wherein the transformation operation is a tuning operation, wherein the tuning operation is one of a white balance tuning operation, a highlight tuning operation, a fill light tuning operation, a sharpen tuning operation, or a soft focus tuning operation.

17. The computer-implemented method of claim 1, further comprising:

displaying a different indication for each of: a default thumbnail image, a selected thumbnail image, and a currently active thumbnail image; and wherein said indication comprises one of: a graphical image transposed over the thumbnail image, a border displayed in manner different than other thumbnail images, displaying the thumbnail image in a highlighted state, or displaying the thumbnail image in a darkened state.

18. A system, comprising:

one or more processors;

a memory coupled to the one or more processors, wherein the memory stores program instructions executable by the one or more processors to implement an image-editing application, wherein said image-editing application is configured to:

display a main image within an area of a user interface on a display device;

display a thumbnail control within a different area of the user interface on the display device for an image transformation operation, wherein said thumbnail control comprises a sequence of thumbnail images calculated from the main image;

wherein each of the one or more thumbnail images shows a different adjustment level for the same image transformation operation to be applied to said main image so that the thumbnail images of the thumbnail control display a series of image transformation adjustment levels for the same image; and in response to determining a user input control is over a particular thumbnail image, without selecting the particular thumbnail image, temporarily transform the main image according to the transformation operation and adjustment level associated with the particular thumbnail image, wherein temporarily transforming the main image occurs within the area of the user interface for the main image, and wherein said temporarily transforming the main image is temporary such that the adjustment level associated with the particular thumbnail image is no longer applied to the main image when the user input control is moved off the particular thumbnail image.

19. The system as recited in claim 18, wherein said determining a user input control is over a particular thumbnail image comprises receiving a mouse over event for the particular thumbnail control.

20. The system as recited in claim 18, wherein the image-editing application is further configured to:

detect user input selecting a thumbnail image;

change the main image to correspond to the selected thumbnail image.

21. The system as recited in claim 20, further comprising:

in response to determining the user input control is off the thumbnail control, restore the main image to correspond to the selected thumbnail image.

22. The system as recited in claim 20, wherein said user input selecting a thumbnail image comprises a mouse click.

23. The system as recited in claim 20, wherein the image-editing application is further configured to:

in response to detecting a user input control is over another thumbnail image, other than the selected thumbnail image, without selecting the another thumbnail image, temporarily transform the main image according to the transformation operation and adjustment level associated with the another thumbnail image.

24. The system as recited in claim 23, wherein the image-editing application is further configured to:

detect the user input control is off the thumbnail image control; and transform the main image according to the transformation operation and adjustment level associated with the selected thumbnail image.

25. The system as recited in claim 18, wherein the image-editing application is further configured to:
  display a slider-bar control for a range of transformation adjustment levels;
  coordinate the movement of a slider-thumb within the slider-bar control with the current position of the user input control over the thumbnail control, wherein said coordinating comprises positioning the slider-thumb within the slider-bar control relative to the current user input control position over the thumbnail control.

26. The system as recited in claim 25, wherein the image-editing application is further configured to:
  detect a dragging operation of the slider-thumb within the slider-bar control; and
  transform the main image to the adjustment level associated with the current position of the slider-thumb within the slider-bar control, wherein said transforming is performed as the slider-thumb is dragged within the slider-bar.

27. The system as recited in claim 26, wherein the image-editing application is further configured to display a numerical value for the adjustment level, wherein the numerical value changes as the slider-thumb moves within the slider-bar control.

28. The system as recited in claim 18, wherein the image-editing application is further configured to:
  display an indication of a default transformation adjustment level on a default thumbnail image, wherein said default thumbnail image corresponds to a neutral adjustment level.

29. The system as recited in claim 18, wherein the image-editing application is further configured to:
  determine a subsection of the main image, wherein said subsection of the main image is an area smaller than the entire image; and
  display the area of the subsection of the main image within each of the thumbnail images according to a zoom-in view of the subsection.

30. The system as recited in claim 29, wherein the image-editing application is further configured to:
  in response to detecting a dragging operation within the main image:
    move the subsection to a new location corresponding with the current position of the user input control; and
    display the area of the new location in each of the thumbnail images according to a zoom-in view of the subsection.

31. The system as recited in claim 18, wherein the transformation operation is one of an auto-correct transformation operation, an exposure transformation operation, or a saturation transformation operation.

32. The system as recited in claim 18, wherein the transformation operation is an effect operation, wherein the effect operation is one of a pop-color effect operation, a hue effect operation, a black-and-white effect operation, a tint effect operation, or a sketch effect operation.

33. The system as recited in claim 18, wherein the transformation operation is a tuning operation, wherein the tuning operation is one of a white balance tuning operation, a highlight tuning operation, a fill light tuning operation, a sharpen tuning operation, or a soft focus tuning operation.

34. The system as recited in claim 18, where in the image-editing application is further configured to:
  display a different indication for each of: a default thumbnail image, a selected thumbnail image, and a currently active thumbnail image; and
  wherein said indication comprises one of: a graphical image transposed over the thumbnail image, a border displayed in manner different than other thumbnail images, displaying the thumbnail image in a highlighted state, or displaying the thumbnail image in a darkened state.

35. A computer-accessible storage medium storing program instructions computer-executable to implement an image-editing application, wherein the image-editing application is configured to:
  display a main image within an area of a user interface on a display device;
  display a thumbnail control within a different area of the user interface on the display device for an image transformation operation,
    wherein said thumbnail control comprises a sequence of thumbnail images calculated the image;
    wherein each of the one or more thumbnail images shows a different adjustment level for the same image transformation operation to be applied to said main image so that the thumbnail images of the thumbnail control display a series of image transformation adjustment levels for the same image; and
  in response to determining a user input control is over a particular thumbnail image, without selecting the particular thumbnail image, temporarily transform the main image according to the transformation operation and adjustment level associated with the particular thumbnail image,
    wherein temporarily transforming the main image occurs within the area of the user interface for the main image, and
    wherein said temporarily transforming the main image is temporary such that the adjustment level associated with the particular thumbnail image is no longer applied to the main image when the user input control is moved off the particular thumbnail image.

36. The computer-accessible storage medium as recited in claim 35, wherein said determining a user input control is over a particular thumbnail image comprises receiving a mouse over event for the particular thumbnail control.

37. The computer-accessible storage medium as recited in claim 35, wherein the image-editing application is further configured to:
  detect user input selecting a thumbnail image;
  change the main image to correspond to the selected thumbnail image.

38. The computer-accessible storage medium as recited in claim 37, further comprising:
  in response to determining the user input control is off the thumbnail control, restore the main image to correspond to the selected thumbnail image.

39. The computer-accessible storage medium as recited in claim 37, wherein said user input selecting a thumbnail image comprises a mouse click.

40. The computer-accessible storage medium as recited in claim 37, wherein the image-editing application is further configured to:
  in response to detecting a user input control is over another thumbnail image, other than the selected thumbnail image, without selecting the another thumbnail image, temporarily transform the main image according to the transformation operation and adjustment level associated with the another thumbnail image.

41. The computer-accessible storage medium as recited in claim 40, wherein the image-editing application is further configured to:
- detect the user input control is off the thumbnail control; and
- transform the main image according to the transformation operation and adjustment level associated with the selected thumbnail image.

42. The computer-accessible storage medium as recited in claim 35, wherein the image-editing application is further configured to:
- display a slider-bar control for a range of transformation adjustment levels;
- coordinate the movement of a slider-thumb within the slider-bar control with the current position of the user input control over the thumbnail control, wherein said coordinating comprises positioning the slider-thumb within the slider-bar control relative to the current user input control position over the thumbnail control.

43. The computer-accessible storage medium as recited in claim 42, wherein the image-editing application is further configured to:
- detect a dragging operation of the slider-thumb within the slider-bar control; and
- transform the main image to the adjustment level associated with the current position of the slider-thumb within the slider-bar control, wherein said transforming is performed as the slider-thumb is dragged within the slider-bar.

44. The computer-accessible storage medium as recited in claim 43, wherein the image-editing application is further configured to display a numerical value for the adjustment level, wherein the numerical value changes as the slider-thumb moves within the slider-bar control.

45. The computer-accessible storage medium as recited in claim 35, wherein the image-editing application is further configured to:
- display an indication of a default transformation adjustment level on a default thumbnail image, wherein the default thumbnail image corresponds to a neutral adjustment level.

46. The computer-accessible storage medium as recited in claim 35, wherein the image-editing application is further configured to:
- determine a subsection of the main image, wherein said subsection of the main image is an area smaller than the entire image; and
- display the area of the subsection of the main image within each of the thumbnail images according to a zoom-in view of the subsection.

47. The computer-accessible storage medium as recited in claim 46, wherein the image-editing application is further configured to:
- in response to detecting a dragging operation within the main image:
  - move the subsection to a new location corresponding with the current position of the user input control; and
  - display the area of the new location in each of the thumbnail images according to a zoom-in view of the subsection.

48. The computer-accessible storage medium as recited in claim 35, wherein the transformation operation is one of an auto-correct transformation operation, an exposure transformation operation, or a saturation transformation operation.

49. The computer-accessible storage medium as recited in claim 35, wherein the transformation operation an effect operation, wherein the effect operation is one of a pop-color effect operation, a hue effect operation, a black-and-white effect operation, a tint effect operation, or a sketch effect operation.

50. The computer-accessible storage medium as recited in claim 35, wherein the transformation operation is a tuning operation, wherein the tuning operation is one of a white balance tuning operation, a highlight tuning operation, a fill light tuning operation, a sharpen tuning operation, or a soft focus tuning operation.

51. The computer-accessible storage medium of claim 35, wherein the image-editing application is further configured to:
- display a different indication for each of: a default thumbnail image, a selected thumbnail image, and a currently active thumbnail image; and
- wherein said indication comprises one of: a graphical image transposed over the thumbnail image, a border displayed in manner different than other thumbnail images, displaying the thumbnail image in a highlighted state, or displaying the thumbnail image in a darkened state.

* * * * *